(12) United States Patent
Kim

(10) Patent No.: US 11,616,843 B2
(45) Date of Patent: Mar. 28, 2023

(54) METHOD AND APPARATUS FOR OPERATING COMMUNICATION NODE USING NETWORK MANAGEMENT FUNCTION IN VEHICLE NETWORK

(71) Applicants: HYUNDAI MOTOR COMPANY, Seoul (KR); KIA MOTORS CORPORATION, Seoul (KR)

(72) Inventor: Dong Ok Kim, Goyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 17/034,681

(22) Filed: Sep. 28, 2020

(65) Prior Publication Data

US 2021/0377343 A1  Dec. 2, 2021

(30) Foreign Application Priority Data

May 29, 2020 (KR) ........................ 10-2020-0064825

(51) Int. Cl.
*G06F 15/173* (2006.01)
*H04L 67/12* (2022.01)
*H04L 12/40* (2006.01)
*H04L 12/12* (2006.01)

(52) U.S. Cl.
CPC .............. *H04L 67/12* (2013.01); *H04L 12/12* (2013.01); *H04L 12/40* (2013.01); *H04L 2012/40273* (2013.01)

(58) Field of Classification Search
None
See application file for complete search history.

(56) References Cited

U.S. PATENT DOCUMENTS 7,957,777 B1 * 6/2011 Vu .................... H04W 52/0229
  455/574
2019/0230705 A1 * 7/2019 Beruto ................ H04W 74/085

FOREIGN PATENT DOCUMENTS

WO    WO-2013026316 A1 *  2/2013 .......... H04B 7/0413

* cited by examiner

*Primary Examiner* — Atta Khan
(74) *Attorney, Agent, or Firm* — Morgan, Lewis & Bockius LLP

(57) ABSTRACT

An operation method of a first communication node constituting a vehicle network includes transitioning an operation state of the first communication node to a wake-up state when a preconfigured event is detected; determining whether a physical layer collision avoidance (PLCA) function is deactivated; in response to determining that the PLCA function is deactivated, generating a message including an indicator indicating that the PLCA function is deactivated; and transmitting the message.

11 Claims, 14 Drawing Sheets

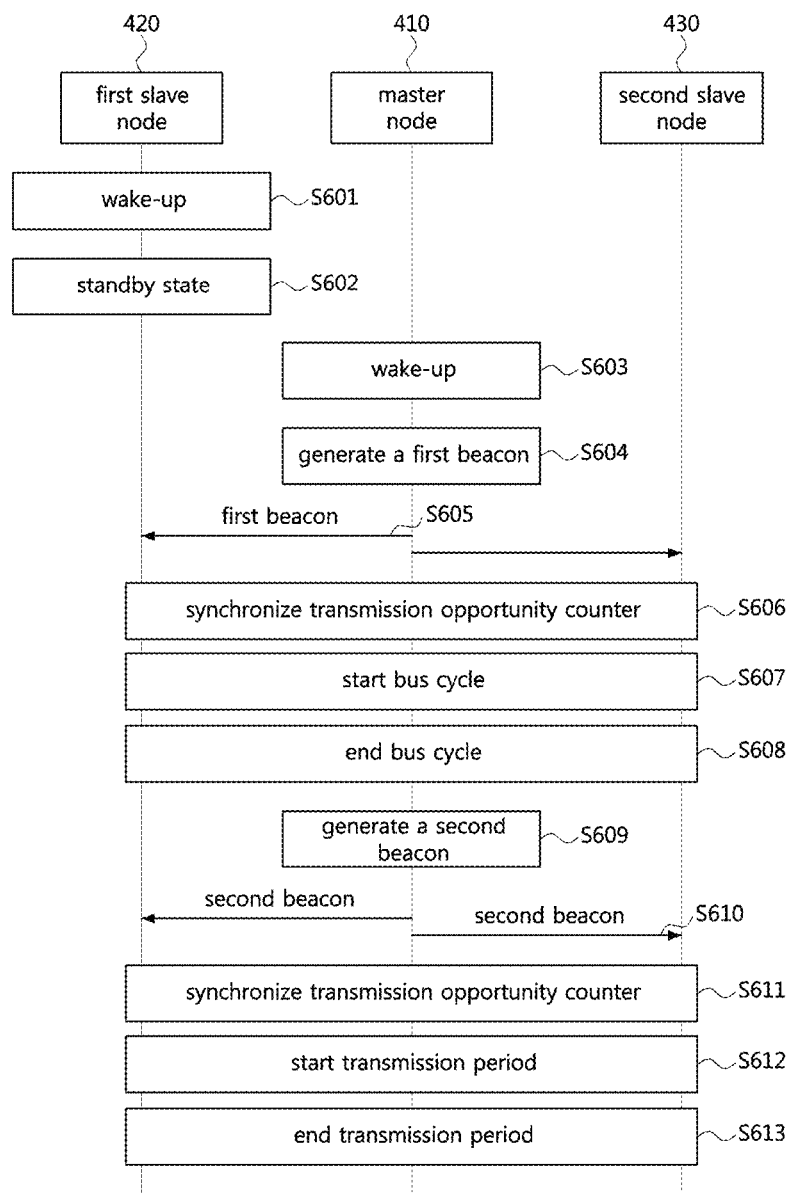

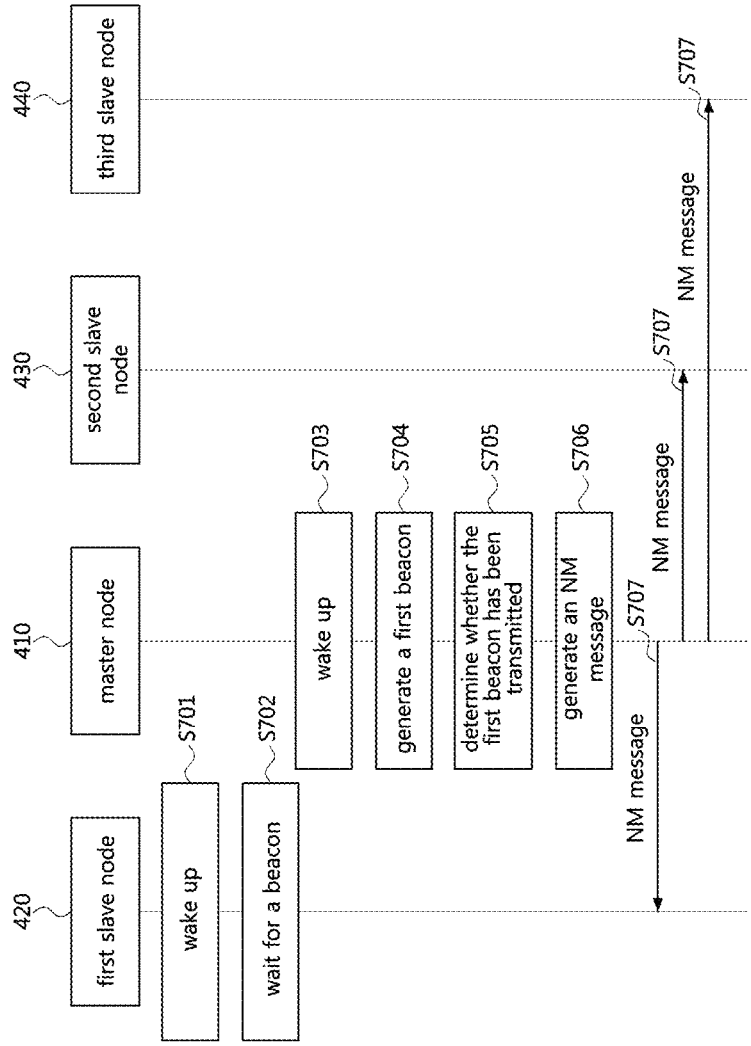

FIG. 8

| | bit 7 | bit 6 | bit 5 | bit 4 | bit 3 | bit 2 | bit 1 | bit 0 |
|---|---|---|---|---|---|---|---|---|
| byte 0 | Control Bit Vector(Default) ~810 | | | | | | | |
| byte 1 | Source Node Identifier(Default) ~820 | | | | | | | |
| ... | | | | | | | | |
| byte i | local_nodeID ~830 | | | | | | | |
| byte i+1 | Primary Master local_nodeID ~840 | | | | | | | |
| byte i+2 | Secondary Master local_nodeInfo ~850 | | | | | | | |
| byte i+3 | curMasterNodeID ~860 | | | | | | | |
| byte i+4 | plca_status ~870-1 | plca_en ~870-2 | | | plca_active ~870-3 | | ~870 | |
| ... | | | | | | | | |
| byte n | | | | | | | | |

METHOD AND APPARATUS FOR OPERATING COMMUNICATION NODE USING NETWORK MANAGEMENT FUNCTION IN VEHICLE NETWORK

CROSS-REFERENCE TO RELATED APPLICATION

This application claims the benefit of priority to Korean Patent Application No. 10-2020-0064825 filed on May 29, 2020 with the Korean Intellectual Property Office (KIPO), the entirety of which is incorporated by reference as if fully set forth herein.

TECHNICAL FIELD

The present disclosure relates to a technology for communications in a vehicle network, and more specifically, to a method and an apparats operating a communication node using a network management function.

BACKGROUND

The number and variety of devices installed within vehicles have increased significantly in accordance with the recent digitalization of vehicle parts. Generally, electronic devices may be used throughout the vehicles, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via a vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Most enhanced safety systems of a vehicle, such as telematics systems and infotainment systems, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

One of the Ethernet protocols that a vehicle network can support may be 10 single pair Ethernet (SPE). In case of a 10SPE network to which a plurality of end nodes are connected, when some end nodes want to simultaneously transmit data packets to other end nodes, collision may occur between the different data packets in a PHY layer. The plurality of end nodes connected to the 10SPE network may use a PHY layer collision avoidance (PLCA) function to avoid the collision in the PHY layer. The PLCA function refers to a function of sequentially granting transmission opportunities for transmitting data packets to the plurality of end nodes connected to the 10SPE network. The PLCA function can provide improved performance in a multi-drop Ethernet network with fewer nodes (less than 16 nodes) through a low propagation delay.

Communication nodes constituting the Ethernet-based vehicle network may be connected in a bus-type network topology. The interface defined in the Institute of Electrical and Electronics Engineers (IEEE) 802.3cg may support a carrier sense multi-access/collision detection (CSMA/CD) function considering collisions between messages and the PLCA function not considering collisions between messages. In general, in the bus-type network topology, the efficiency of the network when the communication network operates based on the PLCA function may be higher than the efficiency of the network when the communication network operates based on the CSMA/CD function.

Operations through the PLCA function can be processed in a reconciliation sublayer (RS) of an Ethernet model. Therefore, main information on the PLCA function such as information on a node identifier (ID), beacon, etc. may not be identified through an Ethernet packet. Accordingly, there is a problem in that it is impossible to know a function on which the communication node existing in the communication network operates based.

SUMMARY

The present disclosure provides a method and an apparatus for identifying whether a PLCA function operates normally in a communication network based on a message including information on PLCA operations.

In accordance with an exemplary embodiment of the present disclosure, an operation method of a first communication node constituting a vehicle network may include transitioning an operation state of the first communication node to a wake-up state when a preconfigured event is detected; determining whether a physical layer collision avoidance (PLCA) function is deactivated; in response to determining that the PLCA function is deactivated, generating a message including an indicator indicating that the PLCA function is deactivated; and transmitting the message.

The message may be a network management (NM) message, and the indicator may further indicate that the first communication node has not transmitted a first beacon.

The indicator may further indicate an operation status of the PLCA function as one of a disabled state, a resynchronization state, and a recovery state.

In response to determining that the PLCA function is deactivated, the first communication node may operate based on a carrier sense multi-access/collision detection (CSMA/CD) function.

The message may further include range information of local identifiers (IDs) for determining a second communication node to transmit a second beacon.

The range information may include a plurality of local IDs, and communication nodes having local IDs included in the plurality of local IDs may be communication nodes for operating based on the PLCA function.

A communication node having a smallest local ID among the plurality of local IDs included in the range information may be determined as the second communication node.

The message may further include a master ID of a communication node operating as a master node, and the master ID may indicate a source ID of the communication node operating as a current master node.

In accordance with another exemplary embodiment of the present disclosure, an operation method of a first communication node constituting a vehicle network may include receiving a wake-up signal from a second communication node included in the vehicle network, and transitioning an operation state of the first communication node to a wake-up state based on the wake-up signal; receiving, from the second communication node, a message including an indicator indicating that a physical layer collision avoidance (PLCA) function is deactivated; and operating based on the information included in the message.

The message may be a network management (NM) message, and the indicator may further indicate that the second communication node has not transmitted a first beacon.

The message may further include range information of local ID identifiers (IDs) for determining a communication node to transmit a second beacon.

The operating based on the information included in the message may include identifying local IDs of communication nodes for operating based on the PLCA function in the range information included in the message; identifying a smallest local ID among the local IDs of communication nodes for operating based on the PLCA function; when the identified smallest local ID and a local ID of the first communication node are same, changing configuration such that the first communication node operates as a master node; and transmitting the second beacon.

The message may further include a master ID of a communication node operating as a master node, and the master ID may indicate a source ID of the communication node operating as a current master node.

In accordance with still another exemplary embodiment of the present disclosure, a first communication node constituting a vehicle network may include a processor and a memory storing at least one instruction executable by the processor. When executed by the processor, the at least one instruction may cause the processor to: transition an operation state of the first communication node to a wake-up state when a preconfigured event is detected; determine whether a physical layer collision avoidance (PLCA) function is deactivated; in response to determining that the PLCA function is deactivated, generate a message including an indicator indicating that the PLCA function is deactivated; and transmit the message.

The message may be a network management (NM) message, and the indicator may further indicate that the first communication node has not transmitted a first beacon.

In response to determining that the PLCA function is deactivated, the first communication node may operate based on a carrier sense multi-access/collision detection (CSMA/CD) function.

The message may further include range information of local identifiers (IDs) for determining a second communication node to transmit a second beacon.

The range information may include a plurality of local IDs, and communication nodes having local IDs included in the plurality of local IDs may be communication nodes for operating based on the PLCA function.

A communication node having a smallest local ID among the plurality of local IDs included in the range information may be determined as the second communication node.

The message may further include a master ID of a communication node operating as a master node, and the master ID may indicate a source ID of the communication node operating as a current master node.

According to the exemplary embodiments of the present disclosure, the PLCA function can be performed more efficiently in the vehicle network environment. In addition, in the vehicle network environment, it is made possible to easily diagnose whether a communication node existing in the vehicle network has a failure. In addition, the reliability of the communication network can be improved, and the performance of the vehicle network can be improved. The effects that the method and apparatus for operating a communication node using the NM function in the vehicle network according to the exemplary embodiments of the present disclosure can achieve are not limited to those mentioned above, and other effects not mentioned will be clearly understood by those of ordinary skill in the art to which the present disclosure pertains.

BRIEF DESCRIPTION OF DRAWINGS

Exemplary embodiments of the present disclosure will become more apparent by describing in detail forms of the present disclosure with reference to the accompanying drawings, in which:

FIG. 6 is a sequence chart illustrating a first exemplary embodiment of an operation method of an end node belonging to a vehicle network;

FIGS. 7A and 7B are sequence charts illustrating a second exemplary embodiment of an operation method of an end node belonging to a vehicle network;

FIG. 8 is a block diagram illustrating an exemplary embodiment of an NM message according to FIGS. 7A and 7B;

Figure 1:
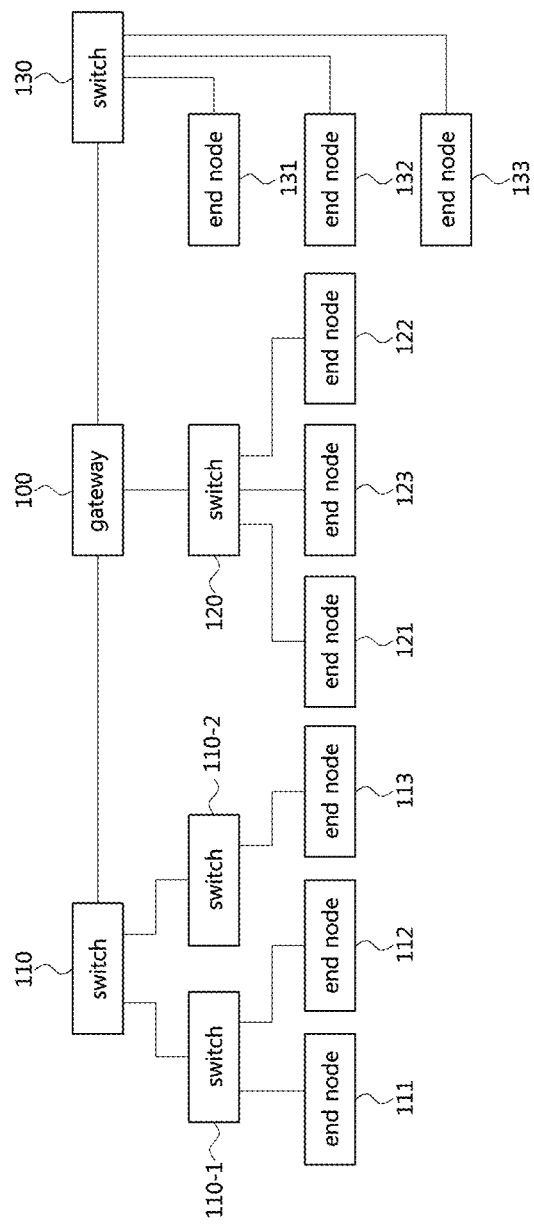
FIG. 1 is a block diagram illustrating a first exemplary embodiment of a vehicle network topology.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, exemplary embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules (e.g., software or hardware). Additionally, it is understood that a controller/controller unit/control unit may perform one or more of the processes described further below, and the term controller/controller unit/control unit refers to a hardware device that includes a memory and a processor. The memory is configured to store the modules (e.g., software), and the processor is specifically configured to execute said modules (e.g., software) to perform one or more processes which are described further below. Moreover, it is understood that the units or modules described herein may embody a controller/controller unit/control unit for controlling operation of the unit or module.

Furthermore, control logic of the present disclosure may be embodied as non-transitory computer readable media on a computer readable medium containing executable program instructions (e.g., the software) executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first exemplary embodiment of a vehicle network topology. As shown in FIG. 1, a communication node forming a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and operate at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to operate various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

The communication nodes (i.e., gateways, switches, end nodes, etc.) forming the vehicle network may be connected in a star topology, a bus topology, a ring topology, a tree topology, a mesh topology, or the like. Further, each of the communication nodes forming the vehicle network may support the CAN protocol, the FlexRay protocol, the MOST protocol, the LIN protocol, the Ethernet protocol, or the like. The exemplary embodiments according to the present disclosure may be applied to the network topology described above, the network topology to which the exemplary embodiments according to the present disclosure is applied may be variously configured without being restricted the above-described network topology.

Figure 2:
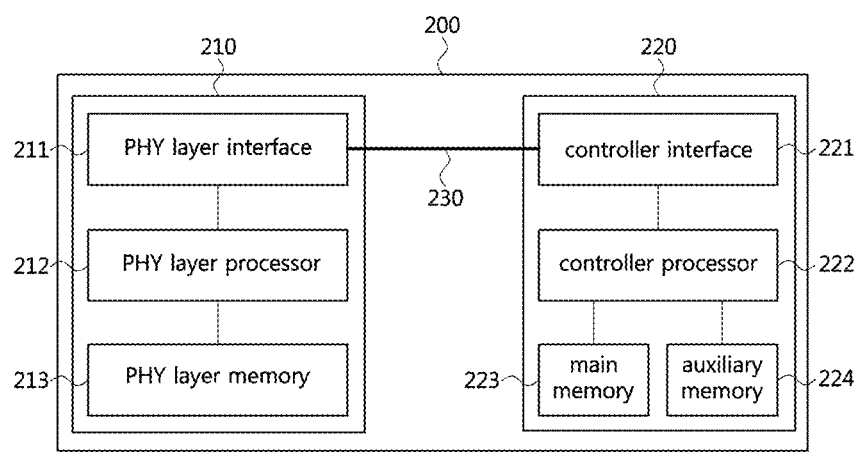
FIG. 2 is a block diagram illustrating a first exemplary embodiment of a communication node belonging to a vehicle network.

FIG. 2 is a block diagram illustrating a first exemplary embodiment of a communication node belonging to a vehicle network. As shown in FIG. 2, a communication node 200 forming a vehicle network may include a physical (PHY) layer unit 210 and a controller unit 220. The communication node 200 may further include a regulator (not shown) configured to supply power. In particular, the controller 220 may be implemented to include a medium access control (MAC) layer. The PHY layer 210 may be configured to receive or transmit signals from or to another communication node. The controller 220 may be configured to operate the PHY layer unit 210 and perform various functions (e.g., an infotainment function, or the like). The PHY layer unit 210 and the controller unit 220 may be implemented as one system on chip (SoC), or alternatively may be implemented as separate chips.

The PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer unit 210 may include a PHY layer interface 211, a PHY layer processor 212, and a PHY layer memory 213. The configuration of the PHY layer unit 210 is not limited thereto, and the PHY layer unit 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface 211 and the PHY layer memory 213. The PHY layer processor 212 may be configured to modulate a signal to be transmitted or demodulate a received signal. The PHY layer processor 212 may be configured to operate the PHY layer memory 213 to input or output a signal. The PHY layer memory 213 may be configured to store the received signal and output the stored signal based on a request from the PHY layer processor 212.

The controller unit 220 may be configured to monitor and operate the PHY layer unit 210 using the MII 230. The controller unit 220 may include a controller interface 221, a controller processor 222, a main memory 223, and an auxiliary memory 224. The controller processor 222 includes an electric circuitry which performs various functions described below. The configuration of the controller unit 220 is not limited thereto, and the controller 220 may be configured in various ways.

The controller interface 221 may be configured to receive a signal from the PHY layer unit 210 (e.g., the PHY layer interface 211) or an upper layer (not shown), transmit the received signal to the controller processor 222, and transmit the signal received from the controller processor 222 to the PHY layer unit 210 or the upper layer. The controller processor 222 may further include independent memory control logic or integrated memory control logic for operating the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored.

A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Figure 3:
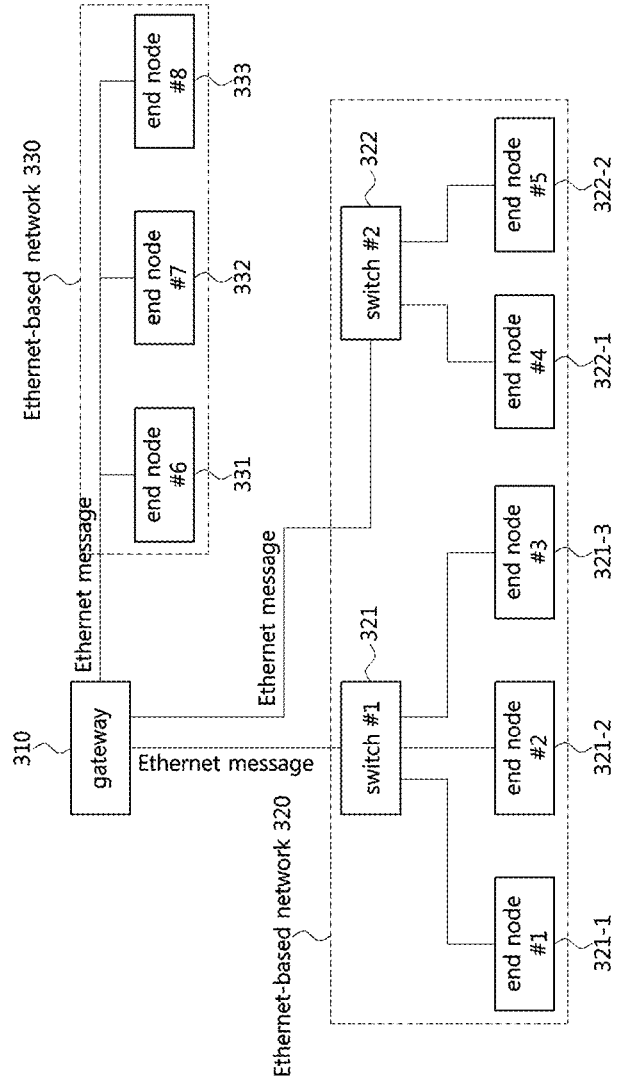
FIG. 3 is a block diagram illustrating a second exemplary embodiment of a vehicle network topology.
Figure 4:
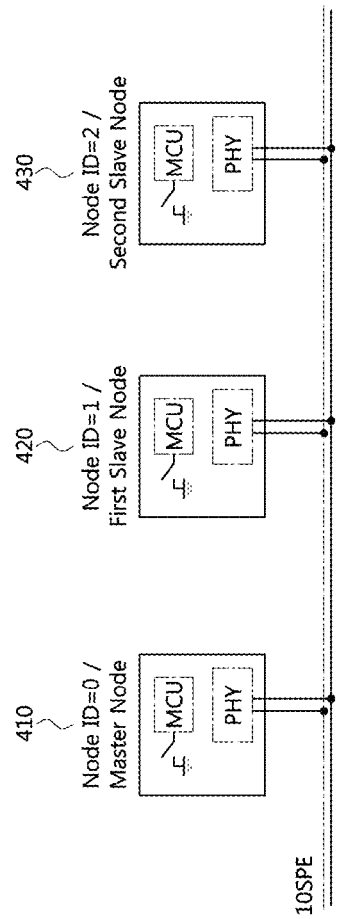
FIG. 4 is a block diagram illustrating an exemplary embodiment of a 10SPE network according to an exemplary embodiment of the present disclosure.

FIG. 3 is a block diagram illustrating a second exemplary embodiment of a vehicle network topology, and FIG. 4 is a block diagram illustrating an exemplary embodiment of a 10SPE network. As shown in FIG. 3, a vehicle network may include a plurality of Ethernet based networks 320 and 330. A gateway 310 belonging to the vehicle network may support Ethernet-based network communication. The Ethernet-based networks may include a switch #1 or a first switch 321, a switch #2 or a second switch 322, an end node #1 or a first end node 321-1, an end node #2 or a second end node 321-2, an end node #3 or a third end node 321-3, an end node #4 or a fourth end node 322-1, an end node #5 or a fifth end node 322-2, an end node #6 or a sixth end node 331, an end node #7 or a seventh end node 332, an end node #8 or an eight end node 333, and the like. The end node #1 321-1, the end node #2 321-2, and the end node #3 323-1 may be connected to the switch #1 321, the end node #4 322-1 and the end node #5 322-2 may be connected to the switch #2 322, and the switch #1 321 and the switch #2 322 may be connected to the gateway 310.

One of the plurality of Ethernet based networks may be a 10 Mbps single pair Ethernet (10SPE) network 330. The end node #6 331, the end node #7 332, and the end node #8 333, which are connected by a 10SPE network scheme, may be connected to the gateway 310 through a bus or a single pair of wires. Messages based on the Ethernet protocol may be referred to as 'Ethernet messages', and the Ethernet messages may be referred to also as 'Ethernet frames', 'Ethernet signals', 'Ethernet packets', or the like. The end nodes 321, 321-1, 321-2, 321-3, 322, 322-1, 322-2, 331, 332, and 333, which are part of the Ethernet-based network, may be configured to communicate using Ethernet messages. Communication between the Ethernet-based networks and the gateway 310 may also be performed using Ethernet messages.

As shown in FIG. 4, the end nodes forming the 10 SPE network may be configured with a master-slave relationship. For example, one end node 410 of the end nodes forming the vehicle network may be a master node, and the remaining nodes 420 and 430 except the master node 410 may be slave nodes. The master node 410 and slave nodes 420 and 430 may operate in a sleep state, and when a local wake-up signal or a remote wake-up signal is received, an operation state of each of the master node 410 and the slave nodes 420 and 430 may transition from the sleep state to a wake-up state.

The master node 410 and the slave nodes 420 and 430 forming the 10 SPE network may refer to electronic control units (ECUs) configured to operate various devices included in the vehicle. Each of the end nodes forming the vehicle network may support the Ethernet protocol. The master node 410 and slave nodes 420 and 430 may be connected in a bus topology. The master node 410 and the slave nodes 420 and 430 may be connected in a power over data lines (PoDL) scheme through a pair of wires. The pair of wires may be wires for supply power to the end node or transferring data packets between the end nodes.

The master node 410 among the end nodes forming the 10 SPE network may be configured to supply a signal and power to wake up the other slave nodes 420 and 430 through a pair of wires. Then, the master node 410 may be configured to communicate with the slave nodes 420 and 430 through a pair of wires. The slave nodes 420 and 430 may be configured to receive the signal from the master node 410 through a pair of wires, and transmit and receive data packets with other nodes through a pair of wires.

When a plurality of end nodes connected to the 10SPE network desire to simultaneously transmit data packets to other end nodes, collisions between different data packets may occur in the PHY layer. A plurality of end nodes connected to the 10SPE network may use a PHY layer collision avoidance (PLCA) function to avoid collision in the PHY layer. In other words, the PLCA function may be a function of sequentially granting a transmission opportunity for transmitting a data packet to a plurality of end nodes connected to the 10SPE network.

Figure 5:
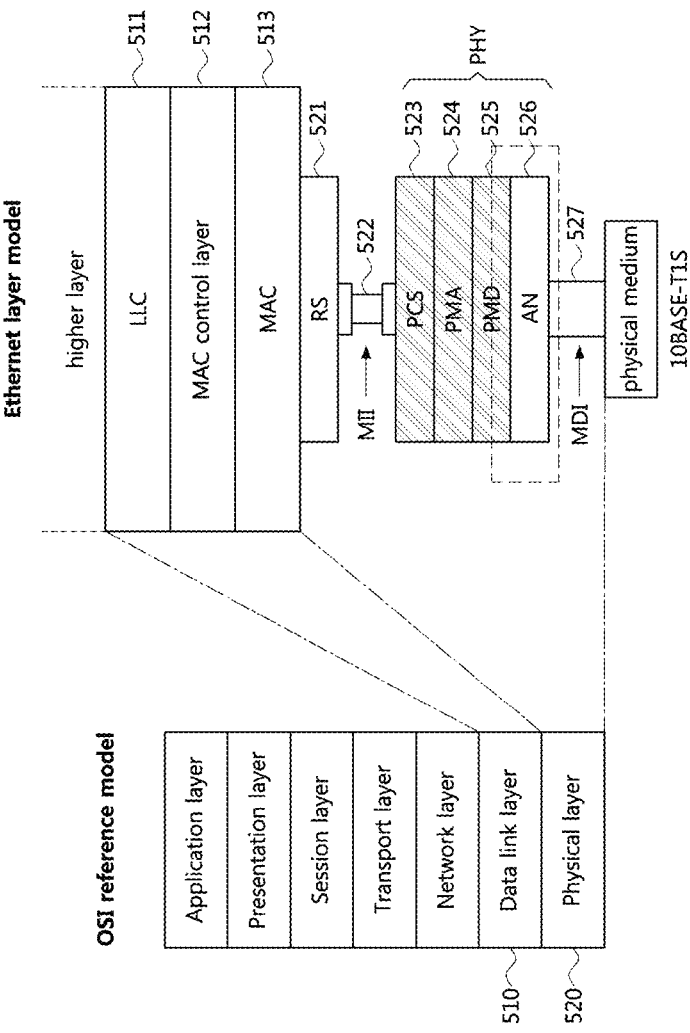
FIG. 5 is a conceptual diagram illustrating an Ethernet layer model according to an exemplary embodiment of the present disclosure.

FIG. 5 is a conceptual diagram illustrating an Ethernet layer model. As shown in FIG. 5, an Ethernet layer model may include a MAC layer and a PHY layer. The MAC layer of the Ethernet layer model may correspond to a data link layer 510 of the open systems interconnection (OSI) reference model, and may include a logical link control (LLC) or another MAC client sublayer 511, a MAC control sublayer 512, and a MAC sublayer 513.

The MAC layer of the Ethernet layer model may be connected to the PHY layer through a reconciliation sublayer (RS) 521 and an MII sublayer 522. The RS 521 and the MII sublayer 522 of the Ethernet layer model may correspond to a PHY layer 520 of the OSI reference model. The RS 521 may be configured to adjust logical signal mapping between the MAC sublayer 513 and a PCS 523 to be described later. The RS 521 may be a sublayer that supports the PCLA function between the MAC layer and the PHY layer connected via the MII sublayer 522. The RS 521 may be configured to adjust mapping of signals between the MAC sublayer and the PCS 523 during a predetermined time slot to prevent collision in the PHY layer due to transmission of frames.

The PHY layer of the Ethernet layer model may correspond to a PHY layer 520 of the OSI reference model, and may include a physical coding sublayer (PCS) 523, a physical media attachment (PMA) sublayer 524, and a physical medium dependent (PMD) sublayer 525, and an auto-negotiation (AN) sublayer 526. The PCS 523 may be configured to obtain data from the MAC layer, and perform line coding on the data based on a protocol of the network (e.g., a transmission speed, etc.). The PCS 523 may be configured to transfer the data generated as a result of the line encoding to the PMA sublayer 524.

The PMA sublayer 524 may be configured to obtain the data generated as a result of the line encoding from the PCS 523, and convert the obtained data into a physical signal. The PMA sublayer 524 may be configured to transfer the data converted into the physical signal to the PMD sublayer 525. The PMD sublayer 525 may be configured to obtain the data converted into the physical signal from the PMA sublayer 524, and convert the obtained physical signal to be suitable for a physical medium connected to the PHY layer.

The AN sublayer 526 may be a sublayer that configures an optimal transmission scheme between end nodes transmitting signals among a plurality of transmission schemes. The AN sublayer 526 may be configured to determine one signal transmission scheme by performing negotiation with other end nodes based on a plurality of signal transmission schemes. In addition, the AN sublayer 526 may be configured to determine master-slave relationship of the plurality of end nodes. For example, when receiving a signal from another end node, the AN sublayer 526 may be configured to determine whether the end node transmitting the signal is a master node or a slave node.

The PHY layer of the Ethernet layer model may be connected to a physical medium through a medium dependent interface (MDI) 527. The MDI 527 may be configured to receive the physical signal from the PMD sublayer 525 and transmit the signal through the physical medium. The MDI 527 of the Ethernet layer model may correspond to the PHY layer 520 of the OSI reference model.

Hereinafter, a method performed at an end node belonging to a vehicle network and a method performed at a corresponding counterpart end node will be described. Even when a method (e.g., transmission or reception of a signal) to be performed at a first end node is described, a corresponding second end node may be configured to perform a method (e.g., reception or transmission of the signal) that corresponds to the method performed at the first end node. In other words, when an operation of the first end node is described, the corresponding second end node may be configured to perform an operation that corresponds to the operation of the first end node. Conversely, when an operation of the second end node is described, the corresponding first end node may be configured to perform an operation that corresponds to the operation of the second end node.

FIG. 6 is a sequence chart illustrating a first exemplary embodiment of an operation method of an end node belonging to a vehicle network. As shown in FIG. 6, each of a plurality of end nodes 410, 420, and 430 may be connected to an Ethernet-based vehicle network. Each of the end nodes in the Ethernet-based vehicle network may be a master node or a slave node. Specifically, the end nodes may be classified into a single master node and a plurality of slave nodes.

PHY identifiers (IDs) that are unique identifiers of PHY layer units included in the end nodes 410, 420, and 430 may be set to the end nodes 410, 420, and 430. The PHY IDs of the end nodes 410, 420, and 430 may determine a master/slave relationship among the end nodes 410, 420, and 430. For example, an end node (e.g., 410) having a PHY ID of 0 may be determined as the master node, and end nodes (e.g., 420 or 430) having a non-zero PHY ID may be determined as the slave nodes.

A controller unit of an end node among the plurality of end nodes, which detects an event from the outside, may transition its operation state from a sleep state to a wake-up state (S601). The woken-up controller unit may wake up a PHY layer unit connected with the controller unit. The PHY layer unit of the woken-up end node (i.e., one of the master node 410 and the slave nodes 420 and 430) may determine and perform an operation after the wake-up according to the master/slave relationship among the end nodes.

The end node 420 waking up in the step S601 may be a slave node whose PHY ID is not 0. The controller unit of the slave node 420 waking up by detecting a local event may wake up its PHY layer unit. Then, the slave node 420 that does not receive a beacon from the master node 410 may maintain a standby state until it receives the beacon from the master node 410 (S602). If the woken-up slave node 420 does not receive the beacon, the slave node 420 may maintain a standby state until the master node 410 wakes up and transmits the beacon (S602).

The end node waking up in a step S603 may be a master node having a PHY ID of 0. The controller unit of the master node 410 waking up by detecting an event may transmit a wake-up signal to a PHY layer unit of the master node 410. The PHY layer unit of the master node 410 may receive the wake-up signal and wake up (S603).

The master node 410 waking up in the step S603 may start a beacon timer and generate a beacon signal (S604). The beacon generated immediately after the master node 410 wakes up in the step S603 may be referred to as a first beacon. The master node 410 may transmit the first beacon signal generated in the step S604 to the slave nodes 420 and 430 connected to the network (S605).

The slave nodes 420 and 430 may receive the first beacon from the master node 410 (S605), and based on the received first beacon, the slave node 420 receiving the first beacon from the master node 410 may synchronize its transmission opportunity counter included in the slave node 420 (S606).

Each of the PHY layer units of the slave nodes 420 and 430 may identify each transmission opportunity counter in order to determine whether a data packet transmission opportunity is granted to itself. The PHY layer unit of each of the slave nodes 420 and 430 may determine whether a transmission opportunity is granted to each of the slave nodes 420 and 430 based on the identified transmission opportunity counter.

When the slave nodes 420 and 430 receive the first beacon from the master node 410 and synchronize their transmission opportunity counters, the transmission opportunity counters of the end nodes 410, 420 and 430 may be set to 0 (S606). After the transmission opportunity counters of the master node 410 and the slave nodes 420 and 430 are synchronized, the master node 410 may stop the beacon timer. When transmission/reception of a beacon of an end node (or the first beacon) is completed, a bus cycle in which the end nodes 410, 420, and 430 connected to the network can transmit data packets may be started (S607). After the end nodes 410, 420, and 430 transmit data packets within the bus cycle, the bus cycle may end (S608).

After a first bus cycle ends, the master node 410 may generate a beacon (S609). The beacon generated after the first bus cycle ends may be referred to as a second beacon. The master node 410 may transmit the second beacon generated in the step S609 to other slave nodes 420 and 430 connected to the network (S610).

The PHY layer units of the slave nodes 420 and 430 may receive the second beacon signal from the master node 410 (S610). The slave nodes 420 and 430 may synchronize their transmission opportunity counters based on the received second beacon (S611). More specifically, as a result of the synchronization operation, the PHY layer units of the master node 410 and the slave nodes 420 and 430 connected to the network may set their transmission opportunity counters to 0 to synchronize their transmission opportunity counters. When the beacon timer of the master node 410 ends, and the transmission/reception of the beacon (or the second beacon) of the end node is completed, a second bus cycle may start (S612). After the second bus cycle ends (S613), a new bus cycle may be repeated.

Figure 7B:
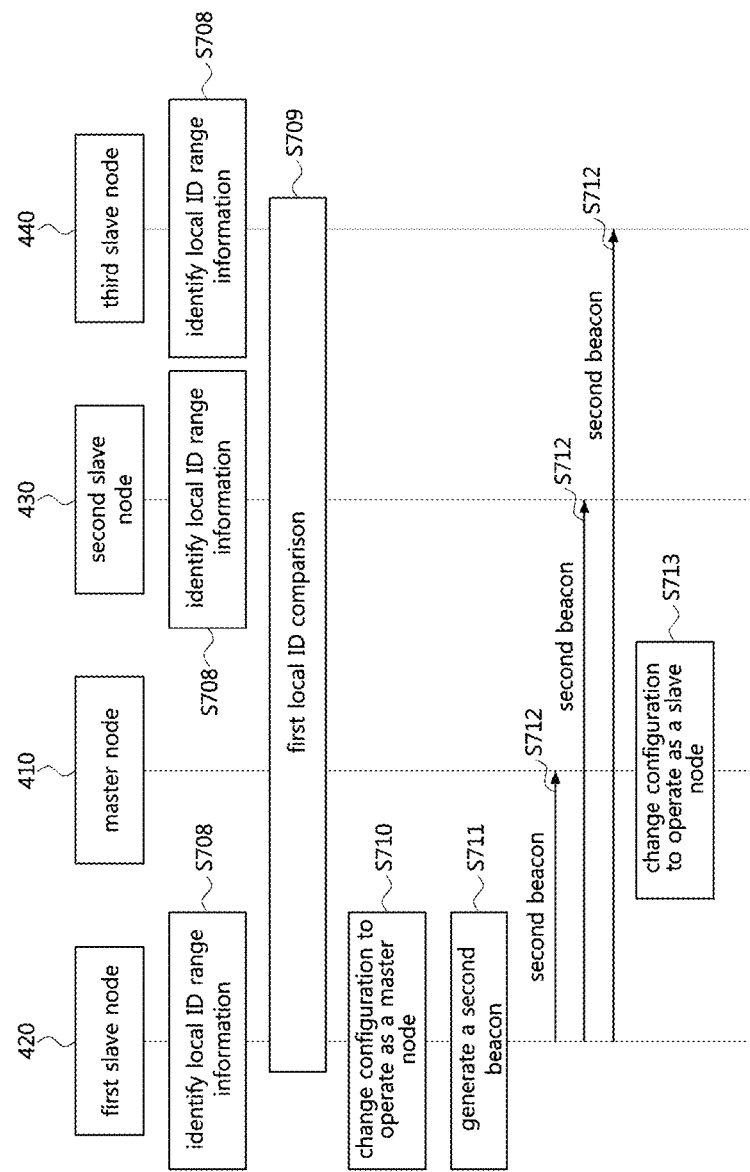

FIGS. 7A and 7B are sequence charts illustrating a second exemplary embodiment of an operation method of an end node belonging to a vehicle network. As shown in FIGS. 7A and 7B, each of the plurality of end nodes 410, 420, 430, and 440 may be connected to the Ethernet-based vehicle network. Each of the end nodes in the Ethernet-based vehicle network may be a master node or a slave node. Specifically, the end nodes may be classified into a single master node and a plurality of slave nodes.

PHY IDs that are unique identifiers of PHY layer units included in the end nodes 410, 420, and 430 may be set to the end nodes 410, 420, and 430. The PHY IDs of the end nodes 410, 420, and 430 may determine a master/slave relationship among the end nodes 410, 420, and 430. For example, an end node (e.g., 410) having a PHY ID of 0 may be determined as the master node, and end nodes (e.g., 420 or 430) having a non-zero PHY ID may be determined as the slave nodes.

A controller unit of an end node among the plurality of end nodes, which detects an event from the outside, may transition its operation state from a sleep state to a wake-up state (S701). The woken-up controller unit may wake up the PHY layer unit connected with the controller unit. The PHY layer unit of the woken-up end node (i.e., one of the master node 410 and the slave nodes 420 and 430) may determine and perform an operation after the wake-up according to the master/slave relationship among the end nodes.

The end node 420 waking up in the step S701 may be a slave node having a non-zero PHY ID. The controller unit of the slave node 420, which is woken up by detecting a local event, may wake up the PHY layer unit connected with the controller unit. The slave node 420 that has not received a beacon from the master node 410 may operate based on a CSMA/CD function until it receives a beacon from the master node 410 (S702). If the woken-up slave node 420 does not receive a beacon, the slave node 420 may operate based on the CSMA/CD function until the master node 410 wakes up and transmits a beacon (S702).

The end node waking up in a step S703 may be the master node having a PHY ID of 0. A controller unit of the master node 410, which is woken up by detecting an event, may transmit a wake-up signal to a PHY layer unit of the master node 410. The PHY layer unit of the master node 410 may receive the wake-up signal and wake up (S703).

The master node 410 waking up in the step S703 may start a beacon timer and generate a beacon signal (S704). The beacon generated immediately after the master node 410 is woken up in the S703 may be referred to as a first beacon. The master node 410 may attempt to transmit the first beacon to the slave nodes 420, 430, and 440. The master node 410 may determine whether the first beacon has been transmitted to the slave nodes 420, 430, and 440 (S705), and may generate a network management (NM) message based on the determination result (S706).

FIG. 8 is a block diagram illustrating an exemplary embodiment of an NM message according to FIGS. 7A and 7B. As shown in FIG. 8, the NM message may include a field including a control bit vector 810 and a field including a source ID 820. In addition, the NM message may include a field including a unique local node ID 830 (hereinafter, a first local ID), a field including a primary master local ID 840 (hereinafter, a second local ID), a field including range information 850 of secondary master local IDs (hereinafter, third local IDs), and a field including a master ID 860 of an end node currently operating as a master node (hereinafter, a master ID). Further, the NM message may further include a field including PLCA function-related information 870. Each field may have a size of 1 octet.

The control bit vector 810 may include an indicator requesting to repeatedly transmit a message, an indicator indicating whether the node has been woken up, or the like. The source node ID 820 may be an identifier of the node, which was defined in a development process of the vehicle. The field including the control bit vector 810 and the field including the source node ID 820 may perform the same functions as the control bit vector field and the source ID field of the NM message defined in the automotive open system architecture (AUTOSAR).

The first local ID 830 may be an identifier for operating based on the PLCA function. Each of the end nodes existing in the vehicle network may have its unique first local ID 830. The second local ID 840 may be an identifier of a master node in the vehicle network. The range information 850 of the third local ID may be range information indicating local IDs of an end node to transmit a new beacon when the master node is not woken up in the vehicle network. The range information 850 of the third local ID may include a plurality of local IDs. The plurality of local IDs may be configured with values of '0x01' to '0x0E'. Meanwhile, the master ID 860 may be an ID of a node currently operating as the master node, and the master ID 860 may be a source ID of the end node having transmitted the beacon. In an initial state, the master ID 860 of the end nodes existing in the vehicle network may be set to the source ID of the master node 410.

The PLCA function-related information 870 may include PLCA operation status information plca_status 870-1, PLCA management mode information plca_en 870-2, and PLCA beacon transmission/reception information plca_active 870-3. The PLCA operation status information 870-1 may be information indicating whether a beacon is being normally transmitted or received. The PLCA operation status information 870-1 may be information indicating whether the PLCA operation status is active (i.e., 'plca_status' is set to 'OK') or inactive (i.e., 'plca_status' is set to 'FAIL'). The inactive state may be one of a disabled state, a resynchronization state, and a recovery state. The PLCA management mode information 870-2 may be information indicating whether a manager function of the PLCA is in an active state (i.e., set to 'plca_en') or an inactive state (i.e., set to 'plca_en*'). The PLCA beacon transmission/reception information 870-3 may be information indicating whether the node has transmitted and received a beacon (i.e., set to 'plca_active') or whether the node is waiting for transmission and reception of a beacon (i.e., set to 'plca_active*').

Figure 9:
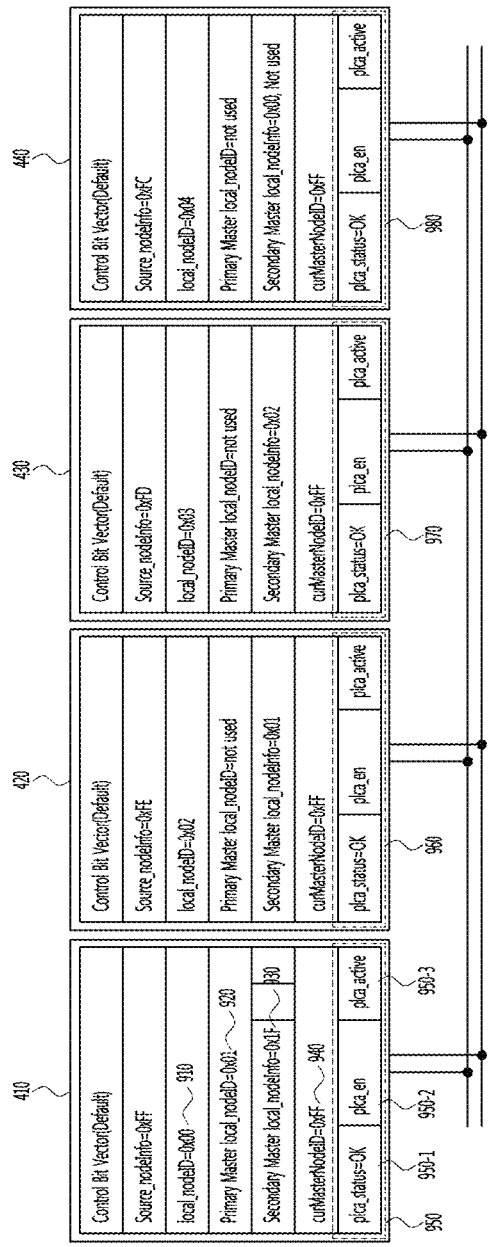
FIG. 9 is a block diagram illustrating a first exemplary state of the vehicle network according to FIGS. 7A and 7B.

Referring back to FIGS. 7A and 7B, the master node 410 may transmit the NM message generated in the step S706 to the slave nodes 420, 430, and 440 (S707). FIG. 9 is a block diagram illustrating a first exemplary state of the vehicle network according to FIGS. 7A and 7B. As shown in FIG. 9, when the beacon is normally transmitted by the master node 410, the master node 410 and the slave nodes 420, 430, and 440 may operate based on the PLCA function.

When the master node 410 and the slave nodes 420, 430, and 440 operate based on the PLCA function, in the PLCA function-related information 950 of the master node 410, the PLCA operation status information plca_status 950-1 may be set to 'OK', the PLCA management mode information 950-2 may be set to 'plca_en', and the PLCA beacon transmission/reception information 950-3 may be set to 'plca_active'. Information constituting the PLCA function-related information 960, 970, and 980 of the slave nodes 420, 430, and 440 may also be set to be the same as the PLCA function-related information 950 of the master node 410. Meanwhile, the first local ID 910 of the master node 410 may be '0x00', and the second local ID 920 of the master node 410 may be '0x01'. The third local ID 930 of the master node 410 may be '0x1F', and the master ID 940 of the master node 410 may be '0xFF', which is the source ID of the master node 410.

Figure 10:
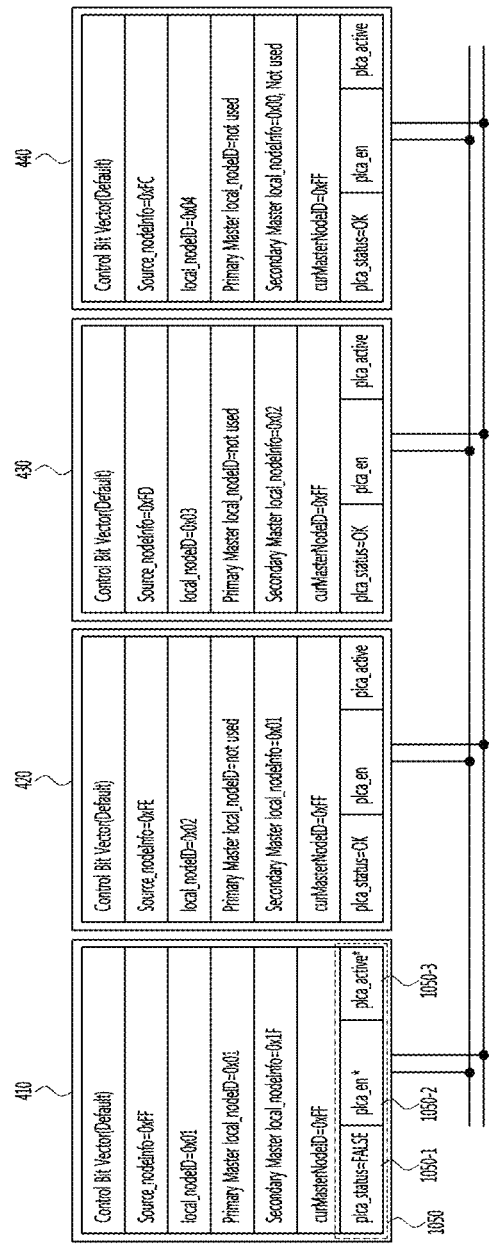
FIG. 10 is a block diagram illustrating a second exemplary state of the vehicle network according to FIGS. 7A and 7B.

Referring back to FIGS. 7A and 7B, the master node 410 may transmit the NM message generated in the step S706 to the slave nodes 420, 430, and 440 (S707). FIG. 10 is a block diagram illustrating a second exemplary state of the vehicle network according to FIGS. 7A and 7B. Unlike FIG. 9, in the example of FIG. 10, the master node 410 may determine that the beacon has not been transmitted by the master node 410. For example, the first local ID of the master node 410 may be '0x00', which may indicate that the PLCA function by the master node 410 is deactivated. In this case, the master node 410 and the slave nodes 420, 430, and 440 may operate based on not the PLCA function but the CSMA/CD function.

When the beacon has not been transmitted by the master node 410, the master node 410 may determine that the PLCA function is deactivated. In this case, the master node 410 may indicate that the PLCA function is deactivated through the PLCA function-related information 1050 of the master node 410. That is, the PLCA operation status information plca_status 1050-1 may be set to 'FALSE', the PLCA management mode information 1050-2 may be set to 'plca_en*', and the PLCA beacon transmission/reception information 1050-3 may be set to 'plca_active*'.

The PLCA operation status information plca_status 1050-1 set to 'FALSE' may indicate that the PLCA operation status is one of the disabled state, the resynchronization state, and the recovery state. In addition, the PLCA management mode information 1050-2 set to 'plca_en*' may indicate that the PLCA management function in an inactive state, and the PLCA beacon transmission/reception information 1050-3 set to 'plca_active*' may indicate that the beacon has not been transmitted by the master node 410.

When it is determined that the PLCA function is deactivated, the master node 410 may generate an NM message including information indicating that the PLCA function is deactivated. In this case, the NM message may further include range information of third local IDs, which indicate a range of local IDs of an end node to transmit a new beacon. The range information of third local IDs may include a plurality of local IDs. The NM message may further include the master ID of the node currently operating as the master node. The node currently operating as the master node may be the node having generated the beacon. The master node 410 may transmit the generated NM message in a broadcast manner.

The slave nodes 420, 430, and 440 may receive the NM message including information indicating that the PLCA function is deactivated from the master node 410 (S707). The slave nodes 420, 430, and 440 may identify the range information of third local IDs included in the NM message (S708). The slave nodes 420, 430, and 440 may compare their third local IDs with the local IDs included in the range information (S709), and based on the comparison result, the slave node 420 having the smallest local ID in the range information of third local IDs may be determined as a communication node to transmit a new beacon. Alternatively, the slave nodes 420, 430, and 440 receiving the NM message including information indicating that the PLCA function is deactivated from the master node 410 may determine a communication node to transmit a new beacon without performing the process of comparing their third local IDs with the range information. In this case, the communication node to transmit a new beacon may be predetermined. Thereafter, the slave node 420 to transmit the new beacon may change configuration to operate as a master node (S710).

Figure 11:
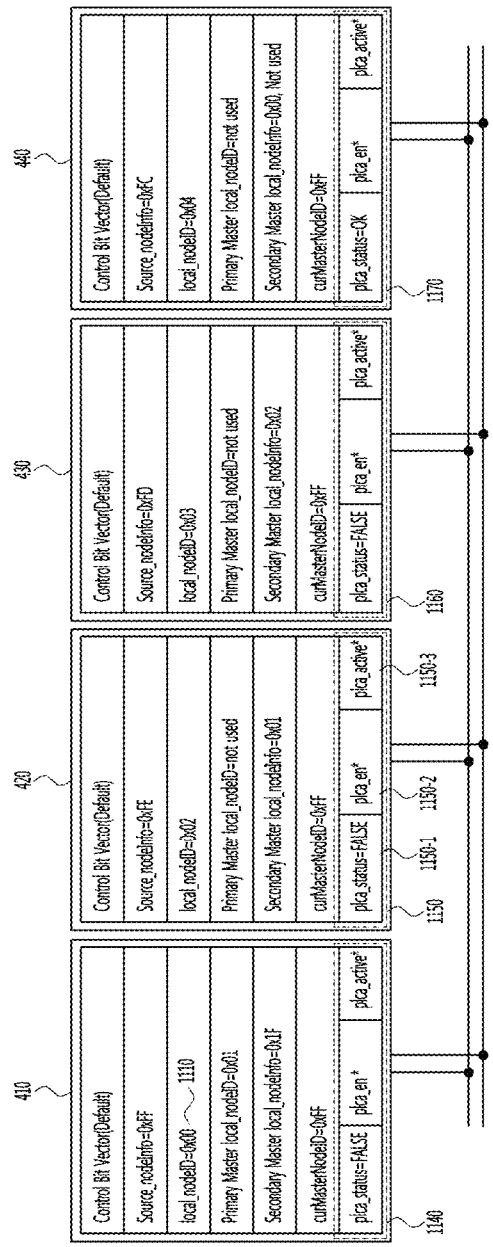
FIG. 11 is a block diagram illustrating a third exemplary state of the vehicle network according to FIGS. 7A and 7B.

FIG. 11 is a block diagram illustrating a third exemplary state of the vehicle network according to FIGS. 7A and 7B. As shown in FIG. 11, the slave nodes 420, 430, and 440 may confirm that the PLCA function is deactivated through the received NM message. Alternatively, the slave nodes 420, 430, and 440 may confirm that the PLCA function is deactivated through a PLCA timeout condition.

When the PLCA function is in the deactivated state, the master node 410 and the slave nodes 410, 420, and 430 may operate based on the CSMA/CD function. Therefore, the PLCA operation status information plca_status 1510-1 may be set to 'FALSE'. In addition, the PLCA management information 1510-2 may be set to 'plca_en*', and the PLCA beacon transmission/reception information 1150-3 may be set to 'plca_active*'. The PLCA function-related information 1140 of the master node 410, the PLCA function-related information 1160 of the second slave node 430, and the PLCA function-related information 1170 of the third slave node 440 may be set to indicate the same state.

The slave nodes 420, 430, and 440 may identify the range information of third local IDs. The end nodes existing in the vehicle network may share the range information of third local IDs. For example, the range information of third local IDs included in the NM message may include a third local ID 1110 of the first slave node 420 and a third local ID 1120 of the second slave node 430, and may not include a third local ID 1130 of the third slave node 440. Accordingly, the first slave node 420 and the second slave node 430 may confirm that they are candidates for a master node to transmit a new beacon through the range information of third local IDs included in the NM message. Also, the third slave node 440 may confirm that it is not a candidate of a master node to transmit a new beacon. Meanwhile, communication nodes having third local IDs included in the range information may be communication nodes for operating based on the PLCA function.

The first slave node 420 and the second slave node 430, which are candidate master nodes for transmitting a new beacon, may perform an arbitration process comparing their third local IDs. The arbitration process may be performed in a manner in which the first slave node 420 and the second slave node 430 exchange messages. Through the arbitration process, the first slave node 420, which is a slave node having a smaller third local ID, may be determined as the node to transmit a new beacon. In this case, the first slave node 420 may change configuration so that it operates as a master node.

Figure 12:
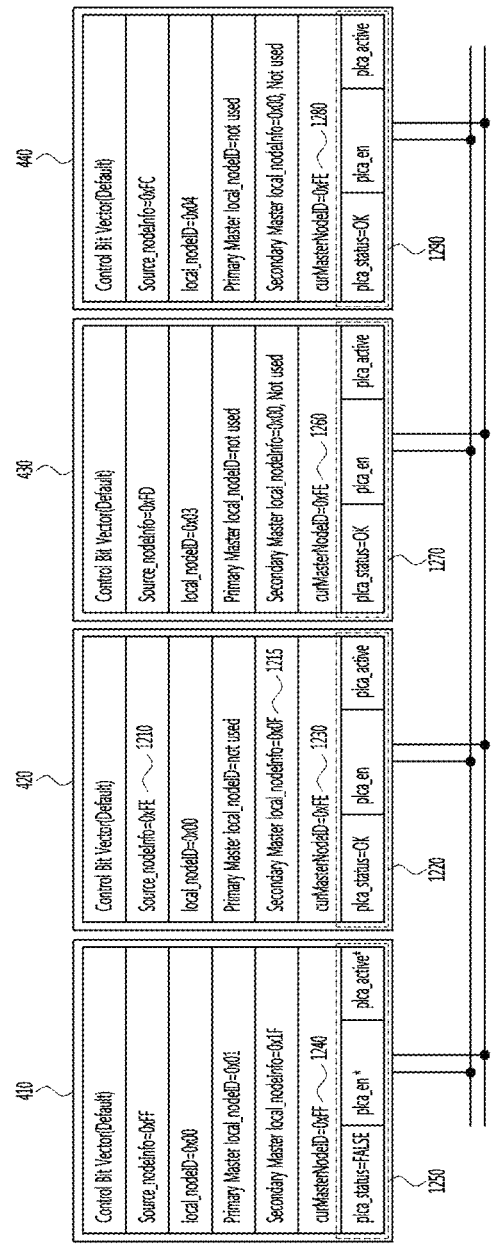
FIG. 12 is a block diagram illustrating a fourth exemplary state of the vehicle network according to FIGS. 7A and 7B.

Referring back to FIGS. 7A and 7B, the first slave node 420 determined as the node to transmit a new beacon may generate a second beacon (S711). The first slave node 420 configured to operate as a master node may transmit the second beacon (S712). FIG. 12 is a block diagram illustrating a fourth exemplary state of the vehicle network according to FIGS. 7A and 7B.

Referring to FIG. 12, when the first slave node 420 transmits the second beacon, the first local ID 1210 may be changed to '0x00', and the third local ID 1215 may be changed to '0x0F'. '0x0F' may be a value indicating that itself is currently operating as the new master node. In addition, the first slave node 420 may change the master ID 1230 to its source ID '0xFE'.

When the second beacon is transmitted by the first slave node 420, the first slave node 420, the second slave node 430, and the third slave node 440 may operate based on the PLCA function according to the second beacon. Therefore, PLCA function-related information 1220 of the first slave node 420, PLCA function-related information 1270 of the second slave node 430, and PLCA function-related information 1290 of the third slave node 440 may indicate that the PLCA function is in the activated state. Specifically, the PLCA operation status information plca_status may be set to 'OK', the PLCA management mode information may be set to 'plca_en', and the PLCA beacon transmission/reception information may be set to 'plca_active'.

Meanwhile, when the first slave node 420 generates and transmits the second beacon, the master ID 1240 of the master node 410 may become different from the master ID 1230 of the first slave node 420, the master ID 1260 of the second slave node 430, and the master ID 1280 of the third slave node 440. That is, the master ID 1240 of the master node 410 may be the source ID '0xFF' of the master node 410, and the master IDs 1230, 1260, and 1280 of the slave nodes 420, 430, and 440 may be '0xFE', which is the source ID of the first slave node 420. In this case, the master node 410 may operate based on the CSMA/CD function.

Figure 13:
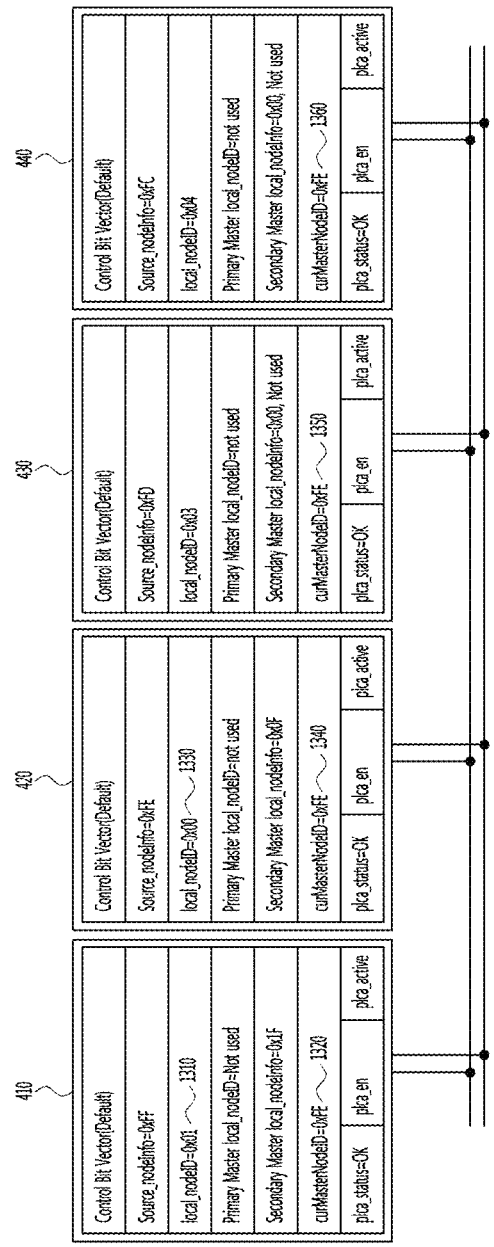
FIG. 13 is a block diagram illustrating a fifth exemplary state of the vehicle network according to FIGS. 7A and 7B.

Referring back to FIGS. 7A and 7B, the master node 410 may change configuration to operate as a slave node (S713). FIG. 13 is a block diagram illustrating a fifth exemplary state of the vehicle network according to FIGS. 7A and 7B. As shown in FIG. 13, the master node 410 may change the first local ID 1310 to '0x01'. In addition, the master node 410 may change the master ID 1320 to '0xFE' indicating the source ID of the slave node 420 having transmitted the second beacon. Accordingly, the master ID 1320 of the master node 1310 and the master IDs 1340, 1350, and 1360 of the slave nodes 420, 430, and 440 may be the same. In this case, the master node 410 may operate again based on the PLCA function. Meanwhile, when the PLCA function of the master node 410 is activated again, the master node 410 may transmit an NM message including an indicator indicating that the PLCA function is activated. In this case, the first slave node 420 operating as the master node may stop transmitting a beacon, and when the beacon transmission operation by the first slave node 420 is stopped, the master node 410 may transmit a beacon again.

The methods according to exemplary embodiments of the present disclosure may be implemented as program instructions executable by a variety of computers and recorded on a computer readable medium. The non-transitory computer readable medium may include a program instruction, a data file, a data structure, or a combination thereof. The program instructions recorded on the non-transitory computer readable medium may be designed and configured specifically for the present disclosure or can be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the operation of the present disclosure, and vice versa.

While the exemplary embodiments of the present disclosure and their advantages have been described in detail above, it should be understood that various changes, substitutions and alterations may be made herein without departing from the scope of the disclosure.

What is claimed is:

1. An operation method of a first communication node constituting a vehicle network, the operation method comprising:
    transitioning an operation state of the first communication node to a wake-up state when a preconfigured event is detected;
    determining whether a physical layer collision avoidance (PLCA) function is deactivated;
    in response to determining that the PLCA function is deactivated, generating a message including an indicator indicating that the PLCA function is deactivated; and
    transmitting the message,
    wherein the message further includes range information of local identifiers (IDs) for determining a second communication node to transmit a second beacon, the range information includes a plurality of local IDs, and communication nodes having local IDs included in the plurality of local IDs are communication nodes for operating based on the PLCA function.

2. The operation method according to claim 1, wherein the message is a network management (NM) message, and the indicator further indicates that the first communication node has not transmitted a first beacon.

3. The operation method according to claim 2, wherein the indicator further indicates an operation status of the PLCA function as one of a disabled state, a resynchronization state, and a recovery state.

4. The operation method according to claim 1, wherein in response to determining that the PLCA function is deactivated, the first communication node operates based on a carrier sense multi-access/collision detection (CSMA/CD) function.

5. The operation method according to claim 1, wherein a communication node having a smallest local ID among the plurality of local IDs included in the range information is determined as the second communication node.

6. The operation method according to claim 1, wherein the message further includes a master ID of a communication node operating as a master node, and the master ID indicates a source ID of the communication node operating as a current master node.

7. A first communication node constituting a vehicle network, the first communication node comprising:
    a processor; and
    a memory storing at least one instruction executable by the processor,
    wherein when executed by the processor, the at least one instruction causes the processor to:
        transition an operation state of the first communication node to a wake-up state when a preconfigured event is detected;
        determine whether a physical layer collision avoidance (PLCA) function is deactivated;
        in response to determining that the PLCA function is deactivated, generate a message including an indicator indicating that the PLCA function is deactivated; and
        transmit the message,
    wherein the message further includes range information of local identifiers (IDs) for determining a second communication node to transmit a second beacon, the range information includes a plurality of local IDs, and communication nodes having local IDs included in the plurality of local IDs are communication nodes for operating based on the PLCA function.

8. The first communication node according to claim 7, wherein the message is a network management (NM) message, and the indicator further indicates that the first communication node has not transmitted a first beacon.

9. The first communication node according to claim 8, wherein in response to determining that the PLCA function is deactivated, the first communication node operates based on a carrier sense multi-access/collision detection (CSMA/CD) function.

10. The first communication node according to claim 7, wherein a communication node having a smallest local ID among the plurality of local IDs included in the range information is determined as the second communication node.

11. The first communication node according to claim 7, wherein the message further includes a master ID of a communication node operating as a master node, and the master ID indicates a source ID of the communication node operating as a current master node.

* * * * *